US010099549B2

(12) United States Patent
Gebert et al.

(10) Patent No.: US 10,099,549 B2
(45) Date of Patent: Oct. 16, 2018

(54) OPERATING FLUID CONTAINER HAVING A STIFFENING ELEMENT

(71) Applicant: KAUTEX TEXTRON GMBH & CO., KG, Bonn (DE)

(72) Inventors: Klaus Gebert, Willich (DE); Ulrich Karsch, Niederkassel (DE); Dirk Eulitz, Bonn (DE); Hartmut Wolf, Koenigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 15/029,978

(22) PCT Filed: Oct. 7, 2014

(86) PCT No.: PCT/EP2014/071411
§ 371 (c)(1),
(2) Date: Apr. 15, 2016

(87) PCT Pub. No.: WO2015/055462
PCT Pub. Date: Apr. 23, 2015

(65) Prior Publication Data
US 2016/0263990 A1    Sep. 15, 2016

(30) Foreign Application Priority Data

Oct. 15, 2013  (DE) .................. 10 2013 017 002

(51) Int. Cl.
*B60K 15/03* (2006.01)
*B29C 49/00* (2006.01)
(Continued)

(52) U.S. Cl.
CPC .... *B60K 15/03177* (2013.01); *B29C 49/0047* (2013.01); *B29C 49/20* (2013.01);
(Continued)

(58) Field of Classification Search
CPC .. F02M 37/103; F02M 37/106; B60K 15/077; B60K 2015/03243;
(Continued)

(56) References Cited

U.S. PATENT DOCUMENTS 4,747,388 A * 5/1988 Tuckey ................ B60K 15/077
123/510
5,536,917 A * 7/1996 Suppelsa ................ B29C 65/08
156/752
(Continued)

FOREIGN PATENT DOCUMENTS

DE    19951670 A1    5/2001
JP    54133219       10/1979
(Continued)

OTHER PUBLICATIONS

English language PCT International Search Report dated Feb. 6, 2015, received in corresponding PCT Application No. PCT/EP14/71411, 3 pgs.
(Continued)

*Primary Examiner* — Craig Schneider
*Assistant Examiner* — Angelisa L Hicks
(74) *Attorney, Agent, or Firm* — Grossman, Tucker, Perreault & Pfleger, PLLC

(57) ABSTRACT

The present invention discloses an operating fluid container (10) made of thermoplastic material for a motor vehicle and a method for equipping an operating fluid container with a stiffening element (20). The operating fluid container (10) here has the following features:
  the operating fluid container (10) has a container opening (12) which is arranged in a container upper shell (11) and is edged by a surround (13);
  the operating fluid container (10) comprises a tubular stiffening element (20) arranged in the operating fluid container (10);
(Continued)

Figure 1:
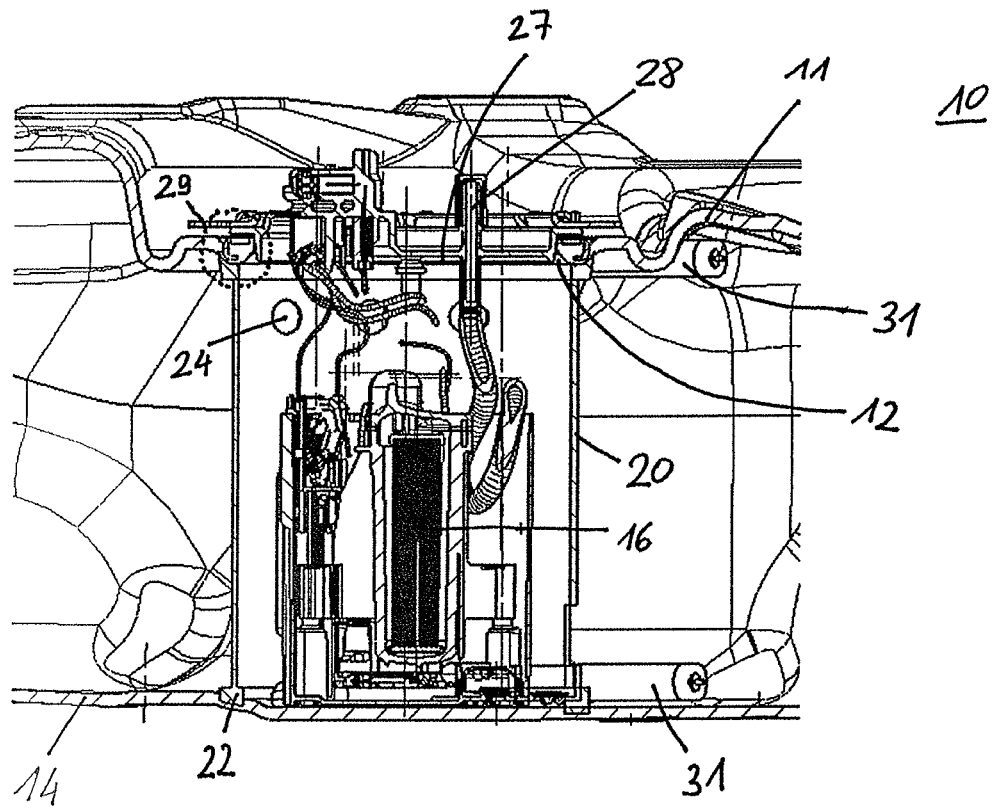

on the end, the stiffening element (20) has a circumferential connecting edge (21) in contact with the container upper shell (11);

in a plan view onto the container upper shell (11), the container opening (12) is surrounded by the connecting edge (21);

the stiffening element (20) is integrally connected to a container lower shell (14) and by means of the connecting edge (21) to the container upper shell (11); and the stiffening element (20) counteracts deformation caused by the internal pressure of the operating fluid container (10).

17 Claims, 3 Drawing Sheets

(51) Int. Cl.
  *B65D 25/02* (2006.01)
  *B29C 49/20* (2006.01)
  *B29L 31/00* (2006.01)

(52) U.S. Cl.
  CPC .............. *B60K 15/03* (2013.01); *B65D 25/02* (2013.01); *B29C 2049/0057* (2013.01); *B29C 2049/2008* (2013.01); *B29C 2049/2013* (2013.01); *B29L 2031/7172* (2013.01); *B60K 2015/03059* (2013.01); *B60K 2015/03217* (2013.01)

(58) Field of Classification Search
  CPC ........... B60K 2015/03105; B60K 2015/03059; B60K 15/03177; B60K 15/03; Y10T 137/86212; B29C 2049/2013; B29C 2049/2008; B29C 49/0047; B29C 49/20; B65D 25/02
  USPC ...................................... 123/509; 137/565.17
  See application file for complete search history.

(56) References Cited

U.S. PATENT DOCUMENTS

| | | |
|---|---|---|
| 6,293,420 B1 | 9/2001 | Richter et al. |
| 6,338,420 B1 | 1/2002 | Pachciarz et al. |
| 7,485,219 B2 | 2/2009 | Urbahn et al. |
| 7,523,745 B2 | 4/2009 | Troxler et al. |
| 9,027,781 B2 | 5/2015 | Criel et al. |
| 9,266,427 B2 | 2/2016 | Hill et al. |
| 2002/0000252 A1* | 1/2002 | Rosseel ................... B29C 49/54 137/587 |
| 2003/0047563 A1* | 3/2003 | Reinelt ............ B60K 15/03177 220/565 |
| 2006/0102634 A1* | 5/2006 | Potter .............. B60K 15/03177 220/562 |
| 2007/0181582 A1 | 8/2007 | Gerard et al. |
| 2009/0134175 A1* | 5/2009 | Bleuel ............. B60K 15/03177 220/564 |
| 2011/0129560 A1 | 6/2011 | Borchert et al. |
| 2011/0139128 A1 | 6/2011 | Zhang et al. |
| 2012/0037638 A1* | 2/2012 | Criel ..................... B29C 49/20 220/501 |
| 2012/0227237 A1 | 9/2012 | Tabuchi |

FOREIGN PATENT DOCUMENTS

| | | | |
|---|---|---|---|
| JP | 11105559 | | 4/1999 |
| JP | 2011093408 A | * | 5/2011 |

OTHER PUBLICATIONS

English language PCT Written Opinon dated Feb. 6, 2015, received in corresponding PCT Application No. PCT/EP14/71411, 8 pgs.
English language PCT International Preliminary Report on Patentability dated Jan. 28, 2016, received in corresponding PCT Application No. PCT/EP14/71411, 5 pgs.

* cited by examiner

OPERATING FLUID CONTAINER HAVING A STIFFENING ELEMENT

The invention relates to an operating fluid container made of thermoplastic material for a motor vehicle.

Furthermore, the present invention relates to a method for producing an operating fluid container made of thermoplastic material for a motor vehicle.

In the case of motor vehicles having an internal combustion engine, when an operating fluid container, in particular the fuel container, is subjected to heat, the operating fluid, e.g. the fuel, is likewise heated, such that the vapour pressure of the operating fluid increases and the operating fluid container is subjected to a corresponding internal pressure when the operating fluid container is closed. In order that an operating fluid container can better withstand an excess pressure, it is possible for one or more tie rods to be arranged therein, these being connected to the container upper shell and to the container lower shell and being able to absorb tensile forces. Operating fluid containers, in particular in the form of fuel containers, may not be provided with a corresponding tie rod in the region of their inspection opening, however, and therefore these operating fluid containers have reduced rigidity in the region of their inspection opening. As a result of the application of pressure as described above, the fuel container is consequently subjected to increased deformation in the region of the inspection opening.

For the ventilation of an operating fluid container in the form of a fuel container, the latter is fluidically connected to an activated carbon filter to filter out fuel vapours. The activated carbon filter is flushed by means of intake air during operation of the internal combustion engine, such that fuel vapours bound in the activated carbon can be fed to the internal combustion engine.

In the case of hybrid motor vehicles, there is a problem caused by the reduced operating time of the internal combustion engine. On account of the reduced operating time of the internal combustion engine, an activated carbon filter which is fluidically connected to the fuel container undergoes correspondingly less flushing, and therefore it is also the case that less fuel vapour bound in the activated carbon can be flushed out. This in turn has the effect that activated carbon filters for hybrid motor vehicles have to have larger dimensions. Furthermore, through the ventilation of the fuel container via the activated carbon filter, more fuel is converted into the vapour phase, and therefore it would be advantageous to design the fuel container to be stiffer and/or more pressure-resistant.

It is known from the prior art to stiffen the fuel container using coils and/or stiffening elements inside the fuel container. Coiled fuel containers are however complex in production and therefore costly. Moreover, an effectively coilable geometry limits the degree of configuration freedom in the design and therefore the utilizable volume.

US 2011/0139128 A1 describes systems and methods for a structurally supportive fuel delivery module coupled to an upper and low wall of a fuel tank. Thereby, the coupling of the supportive fuel delivery module to the lower wall of the fuel tank is realized by a FDM retainer, which is connected with the lower wall of the fuel tank. The connection between the FDM body and the FDM retainer is a non positive connection, so that the FDM is not integrally connected with the lower wall of the fuel tank. The connection of the FDM body with the upper wall of the fuel tank is realized by a locking ring which may be integrated in a FDM top cap of the FDM body. The locking ring is connected with an outside of the upper wall of the fuel tank by a bayonet joint.

US 2011/0129560 A1 describes a wide-slot nozzle for imparting a thickness profile to a preform along the width and length direction of said preform. A first and second warm-plastic preform are provided in web form and are arranged between open mould halves of a blow-moulding tool. Several valves which are connected via a tubing are connecting with the inside of a shell of the fuel tank by a build-in part holder which is arranged in a build-in carrier frame arranged between the mould halves. After the valves are connected with one shell of the fuel tank the blow-moulding tool is opened so that the build-in carrier frame can be removed from the mould halves. After that, the two shells of the fuel tank are connected with each other so that the fuel tank is completed.

The object on which the present invention is based is that of providing an improved operating fluid container which does not have the aforementioned disadvantages of conventional operating fluid containers.

This object is achieved by an operating fluid container having the features indicated in Claim 1. Advantageous configurations are described in the claims dependent thereon.

Furthermore, the present invention is based on the object of providing a method for producing an operating fluid container according to the invention.

This object is achieved by a method having the features indicated in Claim 13.

An operating fluid container according to the invention made of thermoplastic material for a motor vehicle has a container opening which is arranged in a container upper shell and is edged by a surround. The operating fluid container comprises a tubular stiffening element arranged in the operating fluid container inner space. On the end, the stiffening element in turn has a circumferential connecting edge in contact with the container upper shell. In a plan view onto the container upper shell, the container opening is surrounded by the connecting edge 21. Consequently, the diameter of the stiffening element surrounded by the connecting edge 21 in the region of contact with the container opening is greater than the diameter of the container opening. The stiffening element is connected to the operating fluid container by virtue of the fact that the stiffening element is integrally connected to a container lower shell and by means of the connecting edge to the container upper shell. In this case, the stiffening element counteracts deformation caused by the internal pressure of the operating fluid container. Furthermore, if there is a negative pressure in the operating fluid container, the stiffening element also acts as a compression strut, which can absorb compressive forces exerted by the container upper shell and the container lower shell.

The stiffening element can also be referred to as a supporting element or as a tie rod. The container upper shell can alternatively also be referred to as the tank upper shell or else as the container wall and the container lower shell can alternatively be referred to as the container base or as the tank base.

The integral connection between the stiffening element and the container lower shell and the container upper shell can be made, for example, by welding. As an alternative thereto or in addition, the connection between the stiffening element and the container lower shell and/or the container upper shell can also be realized by an adhesive bond, which also represents an integral connection. In addition, it is also possible that the stiffening element is connected to the container upper shell and/or the container lower shell by means of a riveted connection, i.e. consequently is connected to the operating fluid container in a form-fitting manner.

An operating fluid container according to the invention consequently has an increased rigidity in the region of its container opening, in particular in the region of the inspection opening, and therefore the dimensional stability of the operating fluid container is ensured even in the region of the inspection opening by the application of pressure from inside. As a result, it is possible to subject the operating fluid container to a relatively large internal pressure without the latter losing its shape. As a result, processes for the ventilation of the operating fluid container, in particular of an operating fluid container in the form of a fuel container, can in turn be reduced. In particular in the case of hybrid vehicles, the ventilation processes can be avoided as the vehicle is being driven by way of its electric motor and can be scheduled for the operating time in which the motor vehicle is being driven by means of its internal combustion engine. On account of the reduced processes for the ventilation of the operating fluid container, an activated carbon filter which is fluidically connected to the operating fluid container can have a smaller configuration, since it can be dimensioned for a smaller quantity of fuel vapour. On account of the less frequent ventilation processes, an increased vapour pressure remains inside the operating fluid container, and therefore more fuel does not unnecessarily pass into the vapour phase during a ventilation process.

A correspondingly formed operating fluid container in the form of a fuel container is suitable in particular for hybrid motor vehicles, since in the case of hybrid motor vehicles the activated carbon filter which is fluidically connected to the fuel container is flushed to a lesser extent by intake air on account of the reduced operating time of the internal combustion engine. Since the fuel container according to the invention can withstand a relatively high internal pressure, it is the case that, as already described above, the ventilation of the fuel container does not have to be provided as often as is the case for fuel containers known from the prior art. It is therefore possible to reduce the absorption capacity and thus the volume and therefore the size of the activated carbon filter.

It is preferable that the connecting edge has a convex cross-sectional profile. A convex cross-sectional profile affords the advantage that, during the connection process between the stiffening element and the container upper shell, the stiffening element can adapt better to the contour of the inner side of the container upper shell in the region of connection to the container upper shell, and therefore the connection between the stiffening element and the container upper shell is strengthened.

In a further preferred embodiment, the connecting edge has a thickened portion in cross section compared to the rest of the stiffening element. As a result, the integral connection between the stiffening element and the tank upper shell is made over a larger area. Furthermore, irregularities on the inner side of the tank upper shell can be compensated for by the thickened portion.

It is of course also possible that the connecting edge of the stiffening element which is connected to the tank lower shell has a correspondingly formed convex cross-sectional profile and/or has a thickened portion in cross section compared to the rest of the stiffening element.

As an alternative to a convex cross-sectional profile of the connecting edge of the stiffening element which is connected to the tank lower shell, the connecting edge can also be configured with a concave cross section. As a result, warm-plastic material of the tank lower shell can penetrate into a material recess in the connecting edge during the process for connecting the connecting edge to the tank lower shell, as a result of which it is possible to achieve a very reliable connection between the stiffening element and the tank lower shell.

In a preferred embodiment, the operating fluid container comprises a fluid conveying unit arranged in the stiffening element and connected thereto for conveying the operating fluid. Through an appropriate configuration, the volume inside the stiffening element is also utilized optimally.

It is also possible for a fluid conveying unit to be arranged outside the stiffening element in the operating fluid container. To pass out the fluid conveyed through the fluid conveying unit, it is then necessary to provide an opening in the stiffening element, a fluid line being guided through said opening into the stiffening element and then through a cover which closes off the inspection opening. If the fluid connection of the operating fluid container is not arranged in the cover, it is also the case of course that no fluid line should lead through the stiffening element.

It is preferable that at least one fluid exchange opening, via which the stiffening element inner space is fluidically connected to the operating fluid container inner space, is provided in the stiffening element of the operating fluid container according to the invention. The fluid exchange opening is in this case preferably arranged in the region of connection between the stiffening element and the container lower shell, such that fluid exchange is possible even in the case of a low filling level of the operating fluid container. The volume inside the stiffening element can therefore be utilized entirely for receiving the operating fluid.

If the fluid exchange opening is arranged in a region of the stiffening element located further upwards, the stiffening element can also serve as a swirl pot, in which case a primary ventilation valve and a suction unit are preferably arranged inside the stiffening element for reservoir filling.

In the case of the operating fluid container according to the invention, it is preferable that at least one ventilation opening, via which the stiffening element inner space is fluidically connected to the operating fluid container inner space, is arranged in the stiffening element. In this case, the at least one ventilation opening is preferably arranged in the region of connection or just beneath the region of connection between the stiffening element and the operating fluid container upper shell. The ventilation opening ensures that the pressures inside the stiffening element and the operating fluid container inner space are always adapted as the operating fluid container is being filled and also when operating fluid is removed from the operating fluid container.

In the case of the operating fluid container according to the invention, it is preferable that at least those connecting regions of the stiffening element which are in contact with the container upper shell and with the container lower shell consist of thermoplastic material. Consequently, the upper connecting edge and the lower connecting edge of the stiffening element consist of thermoplastic material. This affords the advantage that the integral connection between the stiffening element and the operating fluid container can be achieved in a particularly simple manner. By way of example, the connecting regions of the stiffening element can be brought into contact in the still warm-plastic state with the corresponding container upper shells or container lower shells, such that an integral connection is formed.

In a further preferred embodiment of the operating fluid container according to the invention, the stiffening element is configured as a two-component structural part, wherein at least those connecting regions of the stiffening element which are in contact with the container upper shell and with the container lower shell consist of thermoplastic material. A correspondingly formed stiffening element affords the advantage that the latter can easily be integrally connected to the container lower shell and to the container upper shell and moreover has an increased tensile strength and/or compressive strength.

In a preferred embodiment of the operating fluid container, the stiffening element has recesses along the axial longitudinal extent of the stiffening element. The recesses can be configured as longitudinal recesses. The recesses or longitudinal recesses can act as predetermined breaking points, at which the stiffening element breaks when a predefined tensile force and/or shearing force is exceeded. A corresponding measure is particularly advantageous in particular when the stiffening element is embodied as a two-component structural part.

Here, the maximum tensile force which is transferable between the container lower shell and the container upper shell can be set by way of the number of recesses, which can also be referred to as slots, and by way of the widthwise extent of the slots. The length of the recesses can be used to set the ratio between transferable tensile stress and shear rigidity of the stiffening element. The minimum web width or the maximum web length is in this respect limited by the buckling under negative pressure. A negative pressure inside the operating fluid container can be caused, for example, by a decrease in temperature of the surroundings or by the conveyance of the operating fluid.

The recesses can furthermore serve for flooding the stiffening element inner space, such that the volume of the operating fluid container can be utilized optimally. As an alternative and/or in addition to the recesses, provision can also be made of other openings in the stiffening element.

A predetermined breaking point or a plurality of predetermined breaking points in the stiffening element can also be realized in a different way. For example, the wall thickness of the stiffening element can be reduced at a desired point. It would also be possible to provide a perforation in the circumferential direction of the stiffening element, said perforation reducing the tensile load-bearing capacity at this point.

In the case of the operating fluid container according to the invention, it is preferable that a filling level sensor is arranged on the outer side of the stiffening element. The filling level sensor can be realized, for example, as an immersion tube by means of ultrasonics, capacitively or by means of a lever-type sensor.

In the latter case, the filling level sensor comprises at least one float, which is connected to the filling level sensor by means of a connecting rod.

In a further preferred embodiment of the operating fluid container according to the invention, a filling level sensor is arranged inside the stiffening element. The filling level sensor comprises at least one float and a connecting rod connected to the float. The stiffening element in turn comprises an opening, the connecting rod being connected to the filling level sensor and protruding through the opening in the stiffening element. A correspondingly formed operating fluid container optimally utilizes the available volume inside the operating fluid container and inside the stiffening element despite an increase in the rigidity of the operating fluid container.

It is preferable that the operating fluid container furthermore comprises at least one swash wall, which can be fastened to or is connected to the stiffening element. The swash wall reduces a wave motion of the operating fluid inside the operating fluid container.

Furthermore, the object on which the invention is based is achieved by a method for producing an operating fluid container made of thermoplastic material for a motor vehicle using a multi-part blow-moulding tool with at least two mould halves, which each have a cavity and together form a mould cavity, and a built-in carrier frame. The method here comprises the following method steps:

providing a first and a second warm-plastic preform each in web form;
arranging the preforms between the open mould halves of the blow-moulding tool; arranging a stiffening element between the mould halves by means of a built-in part holder, which is arranged in a built-in carrier frame arranged between the mould halves;
closing the mould halves around the preforms and around the stiffening element against the built-in carrier frame;
pulling the preforms into the cavities; connecting the stiffening element to an inner side of the first preform during or immediately after the moulding;
moving the mould halves apart and removing the built-in carrier frame from the intermediate space between the mould halves; and
closing the mould halves against one another to finish the operating fluid container, the stiffening element being connected to an inner side of the second preform as the mould halves are being closed.

Figure 2:
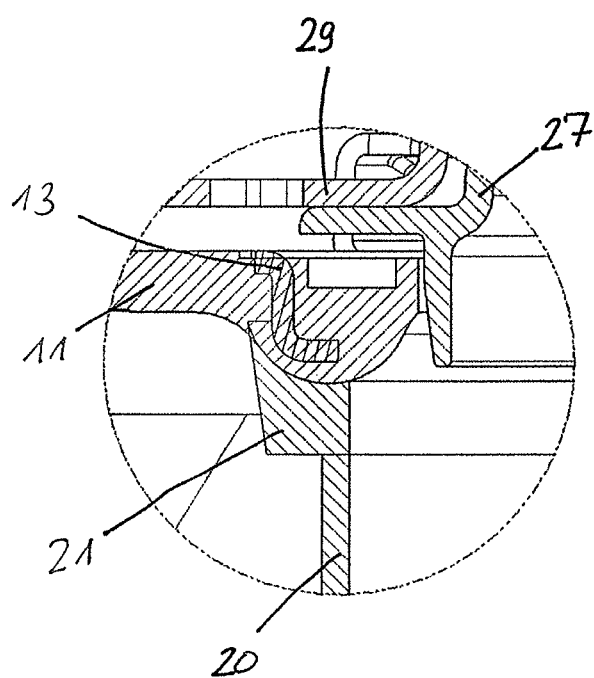
Figure 3:
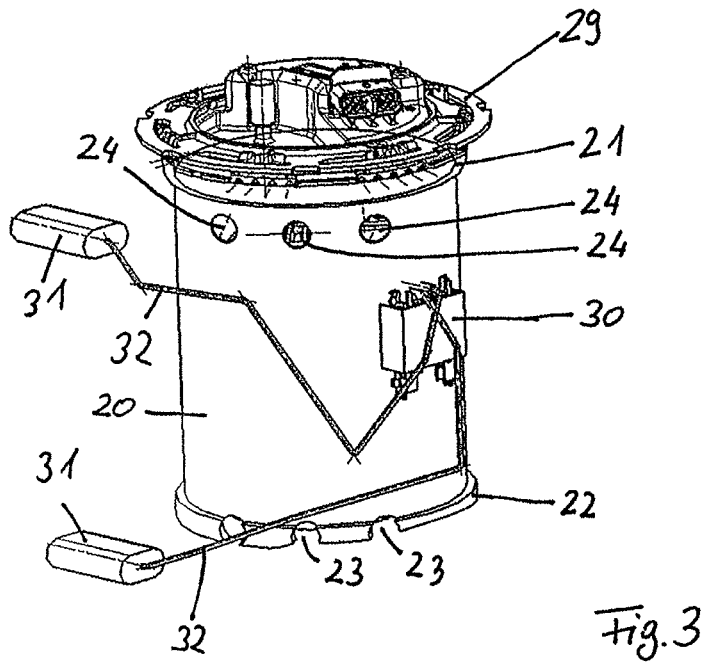
Figure 4:
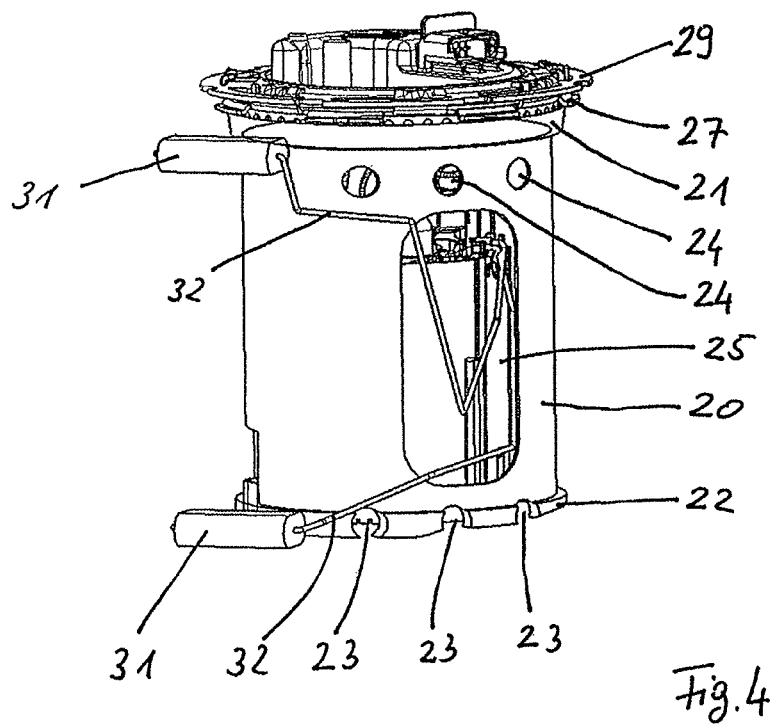
Figure 5:
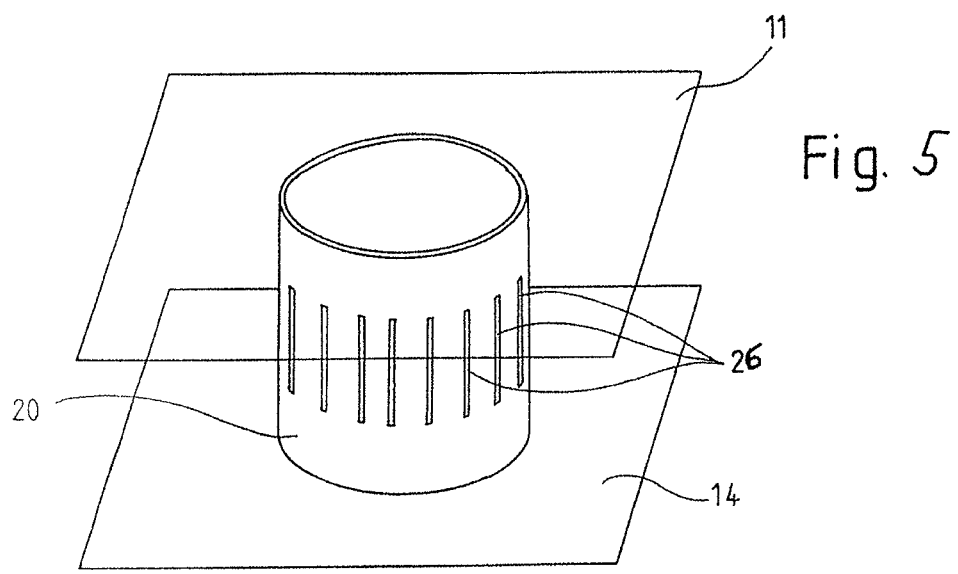

Further advantages, details and features of the invention become apparent hereinbelow from the exemplary embodiments explained. In detail:

FIG. 1: shows a cross-sectional illustration of an operating fluid container according to the invention in the form of a fuel container;

FIG. 2: shows an enlarged view of the region encircled by dashed lines in FIG. 1, in which the region of connection between a stiffening element and a container upper shell is shown in more detail;

FIG. 3: shows a three-dimensional illustration of a stiffening element on its own;

FIG. 4: shows a three-dimensional illustration of a stiffening element of alternative configuration; and FIG. 5: shows a schematic illustration of a stiffening element which is connected to a container base and to a container wall and has longitudinal recesses that produce predetermined breaking points.

In the description which now follows, the same reference signs denote the same structural parts or the same features, and therefore a description which is made with respect to one figure in relation to a structural part also applies to the other figures, such that a repetitive description is avoided.

FIG. 1 shows a cross section of the operating fluid container 10 according to the invention in the form of a fuel container 10. The fuel container 10 is produced from a thermoplastic material and is intended for a motor vehicle. The operating fluid container 10 has a container lower shell 14 or a container base 14 and a container upper shell 11, by means of which the fuel container 10 is delimited in each case. The fuel container 10 has a container opening 12 which is arranged in the container upper shell 11 and is edged by a surround 13, as shown in FIG. 2.

The operating fluid container 10 comprises a tubular stiffening element 20 which is arranged in the inner space thereof and, on the end, has a circumferential upper connecting edge 21 in contact with the container upper shell 11 and, on the end, a circumferential lower connecting edge 22 in contact with the container lower shell 14. The upper circumferential connecting edge 21 in this case surrounds the container opening 12, such that, in a plan view onto the container upper shell 11, the container opening 12 is surrounded by the connecting edge 21.

The stiffening element 20 is integrally connected both to the container lower shell 14 and to the container upper shell 11. The integral connection can be made, for example, by welding and/or adhesive bonding. On account of this connection between the stiffening element 20 and the container upper shell 11 and the container lower shell 14, the stiffening element 20 counteracts deformation caused by the internal pressure of the operating fluid container 10. Furthermore, if there is a negative pressure in the operating fluid container 10, however, the stiffening element 20 also acts as a compression strut, which can absorb compressive forces exerted by the container upper shell 11 and the container lower shell 14.

FIG. 2 shows an enlarged view of the region encircled by dashed lines in FIG. 1, in which the region of connection between the stiffening element 20 and the container upper shell 11 is shown in more detail. It can be seen from FIG. 2 that the connecting edge 21 is in the form of a thickened portion 21 in cross section compared to the rest of the stiffening element 20. In the case that the stiffening element 20 is welded to the container upper shell 11, the thickened portion 21 is used, inter alia, to the effect that the surround 13 is surrounded by sufficient thermoplastic material and is received thereby. Furthermore, the deformation of the thickened portion 21 strengthens the connection between the stiffening element 20 and the container upper shell 11.

It can be seen from FIG. 2 that the container opening 12 is closed off by means of a closure element 27 in the form of a cover 27. The cover 27 is connected to the container wall 11 or to the surround 13 by means of a closure device 29 in the form of a closure ring 29. A seal is arranged between the cover 27 and the container upper shell 11.

It can be seen from FIG. 1 that a fluid conveying unit 16 or an operating fluid pump 16 is arranged in the stiffening element 20, it being possible for said fluid conveying unit or said operating fluid pump to convey the operating fluid to the outer region of the operating fluid container 10 via a fluid line 28 passing through the cover 27.

Furthermore, it can be seen from FIG. 1 that provision is made of at least one electrical line which passes through the cover 27 and to which an electrical structural part arranged in the stiffening element 20 is electrically connected. It is of course also the case that a plurality of electrical lines can be passed through the closure element 27 and can be electrically connected to one or to a plurality of electrical structural parts arranged in the stiffening element 20. The electrical structural parts may be, for example, the operating fluid pump 16 and/or a pressure sensor and/or a temperature sensor and/or a quality sensor for determining the operating fluid quality.

It can furthermore be seen from FIG. 1 that a float 31 of a filling level sensor 30, shown in FIG. 3 but not visible in FIG. 4, is arranged in the operating fluid container 10, with the float 31 being shown in two different positions, specifically in a position adjacent to the container lower shell 14, which the float 31 assumes in the case of a virtually empty operating fluid container 10, and in a position adjacent to the container upper shell 11, which the float 31 assumes in the case of a virtually full operating fluid container 10. The filling level sensor 30 outputs an electrical signal which corresponds to the position of the float 31 and therefore to the filling level of the operating fluid container. The filling level sensor 30 can also be referred to as a resistance card.

It can be seen from FIGS. 3 and 4 that fluid exchange openings 23, via which the stiffening element inner space is fluidically connected to the operating fluid container inner space, are provided in the stiffening element 20. The fluid exchange openings 23 are arranged here in the region of connection of the lower connecting edge 22. The operating fluid located in the operating fluid container inner space can also penetrate into the stiffening element 20 through the fluid exchange opening 23, and therefore the volume of the stiffening element 20 can be utilized optimally for storing the operating fluid.

Furthermore, ventilation openings 24, via which the stiffening element inner space is fluidically connected to the operating fluid container inner space, are arranged in the stiffening element 20. In this respect, the ventilation openings 24 are arranged just beneath the upper connecting edge 21 when the operating fluid container 10 is in the installed position. When the operating fluid container 10 is being filled with the operating fluid, the gas located in the stiffening element 20 can consequently be discharged through the ventilation openings 24 into the operating container inner space and via correspondingly provided valves to the surroundings or to an activated carbon filter.

In the case of the stiffening element shown in FIG. 3, the filling level sensor 30 is arranged on the outer side of the stiffening element 20. The filling level sensor 30 is connected to a float 31 via a connecting rod 32. In FIG. 3, the float 31 and the rod 32 are shown for two different filling levels of the operating fluid container 10.

In FIG. 4, the filling level sensor 30 is arranged inside the stiffening element 20, and therefore the connecting rod 32 protrudes through an opening 25 in the stiffening element 20.

FIG. 5 schematically shows a stiffening element 20 connected to the container lower shell 14 and the container upper shell 11. The stiffening element 20 here has recesses 26 in its wall along the axial longitudinal extent thereof. In the exemplary embodiment shown, the recesses 26 are realized as longitudinal recesses 26. However, the recesses 26 can also have in each case any other desired geometry.

The maximum tensile force which is transferable by the stiffening element 20 can be set by way of the number of longitudinal recesses 26 and by way of the widthwise extent thereof. Predetermined breaking points can thus be introduced into the stiffening element 20 in a targeted manner. Furthermore, the length of the longitudinal recesses 26 can be used to set the ratio between transferable tensile stress and shear rigidity of the stiffening element 20. The minimum web width or the maximum web length is in this respect limited by the buckling under negative pressure loading.

LIST OF REFERENCE SIGNS

10 Operating fluid container/fuel container
11 Container upper shell/tank upper shell/container wall
12 Container opening/inspection opening
13 Surround (of the container opening)
14 Container lower shell/container base/tank lower shell
16 Fluid conveying unit/operating fluid pump
20 Stiffening element
21 (Upper) connecting edge/thickened portion
22 (Lower) connecting edge
23 Fluid exchange opening
24 Ventilation opening
25 Opening/window (in the stiffening element)
26 Recess/longitudinal recess (in the stiffening element)
27 Closure element/cover 28 Fluid line (through the closure element)
29 Closure device/closure ring
30 Filling level sensor
31 Float (of the filling level sensor)
32 Rod (of a filling level sensor)

What is claimed is:

1. An operating fluid container for a motor vehicle, comprising:
   the operating fluid container formed of thermoplastic material and having a container opening which is arranged in a container upper shell and is edged by a surround;
   the operating fluid container includes a tubular stiffening element arranged in the operating fluid container inner space;
   the stiffening element has a circumferential connecting edge in contact with the container upper shell, wherein the connecting edge has a thickened portion in cross section compared to an adjoining portion of the stiffening element;
   in a plan view onto the container upper shell, the container opening is surrounded by the connecting edge;
   the stiffening element is connected to a container lower shell by at least one of being welded, adhesively bonded and riveted to the container lower shell;
   the stiffening element is connected to the container upper shell by the connecting edge being at least one of welded, adhesively bonded and riveted to the container upper shell; and
   the stiffening element counteracts deformation caused by internal pressure within the operating fluid container.

2. The operating fluid container according to claim 1, wherein the connecting edge has a convex cross-sectional profile.

3. The operating fluid container according to claim 1, wherein the thickened portion of the connecting edge is thicker than a remainder of the stiffening element.

4. The operating fluid container according to claim 1, wherein the operating fluid container comprises a fluid conveying unit arranged in the stiffening element and connected thereto for conveying the operating fluid.

5. The operating fluid container according to claim 1, wherein at least one fluid exchange opening, via which the stiffening element inner space is fluidically connected to the operating fluid container inner space, is provided in the stiffening element.

6. The operating fluid container according to claim 1, wherein at least one ventilation opening, via which the stiffening element inner space is fluidically connected to the operating fluid container inner space, is arranged in the stiffening element.

7. The operating fluid container according to claim 1, wherein the connecting edge consist of thermoplastic material.

8. The operating fluid container according to claim 1, wherein the stiffening element is configured as a two-component structural part.

9. The operating fluid container according to claim 1, wherein the stiffening element has a longitudinal axis and recesses extend along the longitudinal axis.

10. The operating fluid container according to claim 1, wherein a filling level sensor is arranged on the outer side of the stiffening element.

11. The operating fluid container according to claim 10, wherein the filling level sensor comprises at least one float, which is connected to the filling level sensor by a connecting rod.

12. The operating fluid container according to claim 1, further comprising:
    a filling level sensor is arranged inside the stiffening element;
    the filling level sensor comprises at least one float and a connecting rod connected to the float;
    the stiffening element has an opening; and
    the connecting rod is connected to the filling level sensor and protrudes through the opening in the stiffening element.

13. The operating fluid container according to claim 1, wherein the connecting edge is located inside the operating fluid container beneath the upper shell.

14. The operating fluid container according to claim 1, wherein the connecting edge is integral with the adjoining portion of the stiffening element.

15. The operating fluid container according to claim 1, wherein the cross section of the connecting edge is a longitudinal cross section.

16. The operating fluid container according to claim 1, wherein the tubular stiffening element arranged in the operating fluid container inner space is arranged entirely in the operating fluid container inner space.

17. The operating fluid container according to claim 1, wherein the stiffening element is connected to the container upper shell by the connecting edge being welded to the container upper shell.

* * * * *